United States Patent
Shen et al.

(10) Patent No.: US 11,360,223 B2
(45) Date of Patent: Jun. 14, 2022

(54) SYSTEM AND METHOD FOR IMPROVED FULL WAVEFORM INVERSION

(71) Applicant: Chevron U.S.A. Inc., San Ramon, CA (US)

(72) Inventors: Peng Shen, Katy, TX (US); Uwe K. Albertin, Katy, TX (US); Lin Zhang, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 839 days.

(21) Appl. No.: 16/136,616

(22) Filed: Sep. 20, 2018

(65) Prior Publication Data
US 2019/0086564 A1  Mar. 21, 2019

Related U.S. Application Data

(60) Provisional application No. 62/561,471, filed on Sep. 21, 2017.

(51) Int. Cl.
*G01V 1/28* (2006.01)
*G01V 1/30* (2006.01)
*G01V 1/34* (2006.01)

(52) U.S. Cl.
CPC .............. *G01V 1/282* (2013.01); *G01V 1/305* (2013.01); *G01V 1/34* (2013.01); *G01V 2210/42* (2013.01); *G01V 2210/614* (2013.01); *G01V 2210/6222* (2013.01); *G01V 2210/67* (2013.01)

(58) Field of Classification Search
CPC .......... G01V 1/282; G01V 1/305; G01V 1/34; G01V 2210/614; G01V 2210/6222; G01V 2210/67; G01V 2210/42
See application file for complete search history.

(56) References Cited

U.S. PATENT DOCUMENTS

| 2019/0086564 A1* | 3/2019 | Shen | G01V 1/282 |
| 2021/0223424 A1* | 7/2021 | Valensi | G01V 1/282 |

FOREIGN PATENT DOCUMENTS

| AU | 2018335566 A1 * | 2/2020 | G01V 1/34 |
| EP | 3685193 A1 * | 7/2020 | G01V 1/282 |
| WO | WO-2019058294 A1 * | 3/2019 | G01V 1/282 |

OTHER PUBLICATIONS

PCT International Search Report and Written Opinion, dated Dec. 6, 2018, issued in International Application No. PCT/IB2018/057243, filed on Sep. 20, 2018, 10 pages.
Han et al., "Spline Envelope Full Waveform Inversion", Society of Exploration Geophysicists, SEG International Exposition and 86th Annual Meeting, 2016, pp. 1496-1500.
Prieux et al., "Building Starting Model for Full Waveform Inversion from Wide-Aperture Data by Stereotomography", Society of Exploration Geophysicists, SEG Denver 2010 Annual Meeting, pp. 988-992.
Kadu et al., "Salt Reconstruction in Full-Waveform Inversion with a Parametric Level-Set Method", IEEE Transactions on Computational Imaging, Jun. 2017, pp. 305-315, vol. 3, No. 2.

(Continued)

*Primary Examiner* — Daniel Pihulic
(74) *Attorney, Agent, or Firm* — Marie L. Clapp

(57) ABSTRACT

A method is described for full waveform inversion using a b-spline projection that produces an earth model that can be used for seismic imaging. The method may be executed by a computer system.

4 Claims, 11 Drawing Sheets

(56) References Cited

OTHER PUBLICATIONS

Fracois Clement et al., Migration-based Traveltime Waveform Inversion of 2-D Simple Structures: A Synthetic Example, Geophysics, May-Jun. 2001, 845-860, vol. 66, No. 3.

Bjorn Engquist et al., Application of the Wasserstein Metric to Seismic Signals, Communications in Mathematical Sciences, 2014, 979-988, vol. 12, No. 5.

Tong W. Fei et al., Full Waveform Inversion without Low Frequencies: A Synthetic Study, SEG Las Vegas Annual Meeting, 2012, 1-5.

K. Jiao et al., Matching Pursuit Full Waveform Inversion, 77th EAGE Conference & Exhibition, Jun. 1-4, 2015, IFEMA Madrid, Spain.

Patrick Lailly, The Seismic Inverse Problem as a Sequence of Before Stack Migrations, in Conference on Inverse Scattering: Theory and Applications: Society for Industrial and Applied Mathematics, 1983, pp. 206-220.

L. Metivier et al., An Optimal Transport Distance for Full Waveform Inversion: Application to the 2014 Chevron Benchmark Data-Set, SEG International Exposition and 86th Annual Meeting, 2016, 1278-1283.

Peng Shen et al., Differential Semblance Velocity Analysis by Wave-Equation Migration, Society of Exploration Geophysicists, 73rd Annual International Meeting, Expanded Abstracts, 2003, 2132-2135.

Peng Shen et al., Automatic Velocity Analysis Via Shot Profile Migration, Geophysics, Sep.-Oct. 2008, VE49-VE59, vol. 73, No. 5.

Albert Tarantola, Inversion of Seismic Reflection Data in the Acoustic Approximation, Geophysics, Aug. 1984, 1259-1266, vol. 49, No. 8.

Sheng Xu et al., Inversion on Reflected Seismic Wave, SEG Las Vegas Annual Meeting, 2012, 1-7.

Zhiguang Xue et al., Full Waveform Inversion Using Smoothing Kernels, SEG International Exposition and 86th Annual Meeting, SEG Technical Program Expanded Abstracts, 2016, 1358-1363.

\* cited by examiner

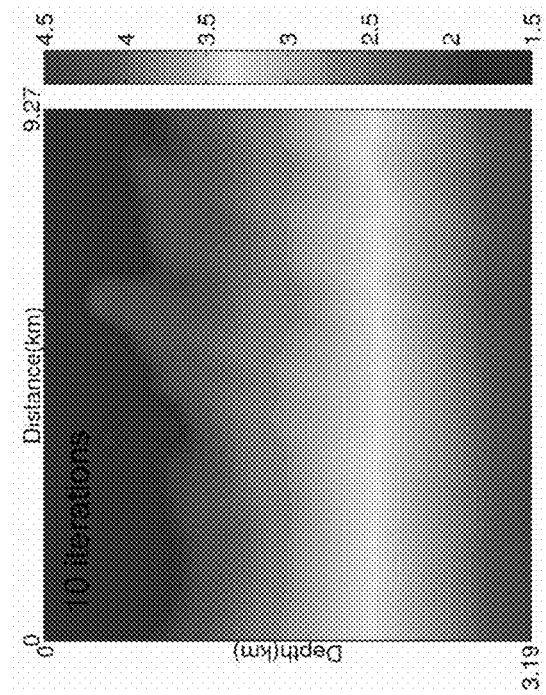
FIG. 6A
FIG. 6B
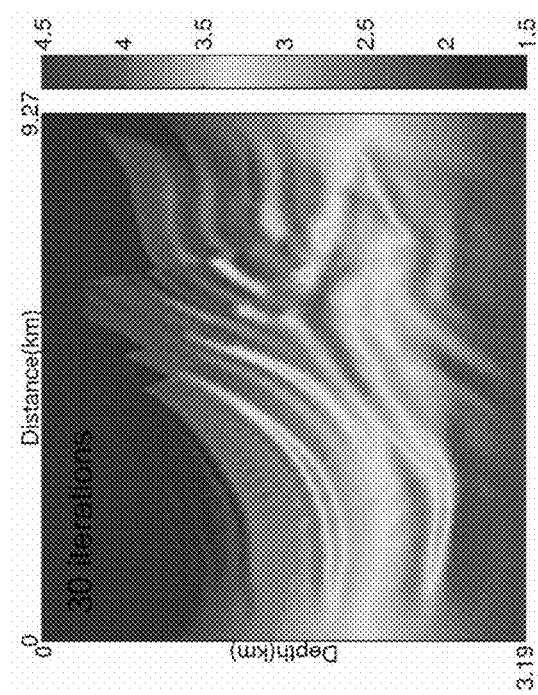
FIG. 6C
FIG. 6D

SYSTEM AND METHOD FOR IMPROVED FULL WAVEFORM INVERSION

CROSS-REFERENCE TO RELATED APPLICATIONS

The present application claims the priority benefit of U.S. Provisional Application Ser. No. 62/561,471, filed on Sep. 21, 2017, which is incorporated herein by reference in its entirety.

STATEMENT REGARDING FEDERALLY SPONSORED RESEARCH OR DEVELOPMENT

Not applicable.

TECHNICAL FIELD

The disclosed embodiments relate generally to techniques for seismic imaging of subsurface reservoirs for the purpose of hydrocarbon exploration and production and, in particular, to a method of improved full waveform inversion applied to seismic data for improved velocity model construction to be used in seismic imaging.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This process may include determining the velocities of the subsurface formations in order to perform the imaging. Determining the velocities may be done by a number of methods, such as semblance analysis, tomography, or full waveform inversion. Full waveform inversion (FWI) is a computationally expensive process that in prone to problems such as cycle-skipping when using conventional methods. Improved seismic images from improved subsurface velocities allow better interpretation of the locations of rock and fluid property changes. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for more accurate FWI methods to allow better seismic imaging that will in turn allow better seismic interpretation of potential hydrocarbon reservoirs.

SUMMARY

In accordance with some embodiments, a method of full waveform inversion using b-spline projection is disclosed. An embodiment the full waveform inversion using b-spline projection includes computing an objective function; picking a set of b-spline dimension parameters $M_t$, $M_r$ so that $B_{M_tM_r}^{c1,c2}(d^s)$ is expected to match $B_{M_tM_r}^{c1,c2}(d^0)$ within a quarter scale-length given the initial earth model wherein c1 and c2 are degrees of smoothness associated to each b-spline dimension; picking a set of b-spline dimension parameters $M_z$, $M_x$ in vertical and horizontal directions, respectively, so that the length-scales, $L_z/(M_x-c1+1), L_x/(M_z-c2+1)$, are approximately the length-scales of velocity variations that match length-scales of $B_{M_tM_r}^{c1,c2}(d^s)$ from a forward simulation, where $L_x$ and $L_z$ are horizontal and vertical sizes of the model, solving $b^* = \arg\min_b \|B_dB_dB_dB^*_d(d^s(B_mb)-d^0)\|^2$ given initial b-spline model parameters determined from solving $\arg\min_b \|B_mb - V_{init}\|^2$, where if is a function of a set of model space b-spline parameters b, wherein model space b-spline operator $B_m = B_{M_zM_x}^{c1,c2}$ and data domain b-spline operator $B_d = B_{M_tM_r}^{c1,c2}$ work in separate domains simultaneously; and repeating the steps of computing the objective function, picking the set of b-spline dimension parameters $M_t$, $M_r$, picking the set of b-spline dimension parameters $M_z$, $M_x$, and solving $b^*$ with increased $M_t$, $M_r$, $M_z$, and $M_x$ so that matching between length-scales of the b-spline projected data and the model is maintained; computing a gradient with respect to velocity; and producing a quasi-Newton's update to generate the updated earth model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIGS. 6A-6D illustrate intermediate results of some embodiments for the Marmousi model;

Like reference numerals refer to corresponding parts throughout the drawings.

DETAILED DESCRIPTION OF EMBODIMENTS

Figure 2:
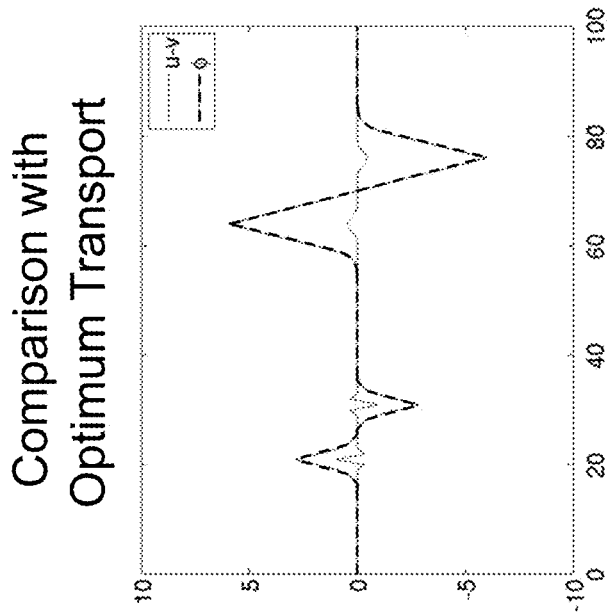
FIG. 2 illustrates an aspect of b-spline projection, in accordance with some embodiments.

Described below are methods, systems, and computer readable storage media that provide a manner of seismic imaging. These embodiments are designed to be of particular use for seismic imaging of subsurface volumes in geologically complex areas.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. The seismic data can be processed and inverted to obtain a velocity model of the subsurface, for the P-wave velocity ($V_p$) and/or the shear-wave velocity ($V_s$). The velocity model may then be used by a seismic imaging method to generate an image from the seismic data. In the present invention, the inversion to obtain the velocity model is done via full waveform inversion (FWI) using a b-spline projection. This method makes use of reflection data as well as diving waves and does not use a Fourier filter. Conventional FWI techniques are prone to fail where cycle-skipping may occur, but the present method overcomes this problem by providing the expected phase rotation. Furthermore, this method uses controlled scale matching in the data domain and, if the initial velocity provides a scale match, the method converges quickly to a more accurate velocity model than is possible with conventional FWI techniques.

We explain a method of full waveform inversion (FWI) using basis spline (b-spline) projections in data domain. From the perspective of the gradient computation, the proposed method belongs to conventional FWI: it employs two Green's functions in correlation to produce the search direction for a quasi-Newton's step for the velocity optimization. On the other hand, unlike the conventional FWI methods, the proposed method does not mute the reflections neither use low-pass filters to re-move the high frequency components of data. The reason we are able to keep the reflection and the high frequency components so that the velocity information contained in them can be utilized to improve the performance of FWI in the deep, is due to the application of the b-spline projection that properly merges the cycle skips between the synthetic and the observed data. We construct the objective function in a least-squares sense following the b-spline projection to the data residual. Further, we maintain the spectrum of the source wavelet so that it matches the spectrum of the original data. In doing so, we make the method completely aligned with the conventional high frequency FWI. The only difference is that the data residual is modified by the b-spline projection. We observe from the synthetic examples that the long length-scale updates are rapidly achieved. To ensure the consistency between the length-scales in data and model, we later impose a model space b-spline projection to constrain the velocity update.

The conventional measure of the difference of two signals, which usually takes the form of |a−b|, or the L-p norm of a−b, is not suitable for the seismic long wavelength velocity inversions. The reason is deeply rooted in the fact that the phase changes between signal a and b are not directly recorded in a−b and thus induces local minima which prevent us from finding the true earth media parameters. This can be seen in the left panel of FIG. 1. The method of the present invention provides an simple and elegant solution to this issue. The recent development of Optimum Transport (OT) following the 1975 Nobel prize work conducted by Kantorivitch leads to a complicated solution by finding the Kantorivitch-Rubinstein (KR) norm of a−b, which employs sophisticated convex analysis algorithms. Although KR norm is the right mathematical notion to use because it is free of local minima, the methods we employ to find the KR norm themselves are subject to local minima difficulties. The computation of KR norms is subject to a highly nonlinear process and is oftentimes not stable. The resulting minimizer of KR norm, which we use as the data residual, can distort the frequency spectrum of the input data by a large amount.

Figure 1:
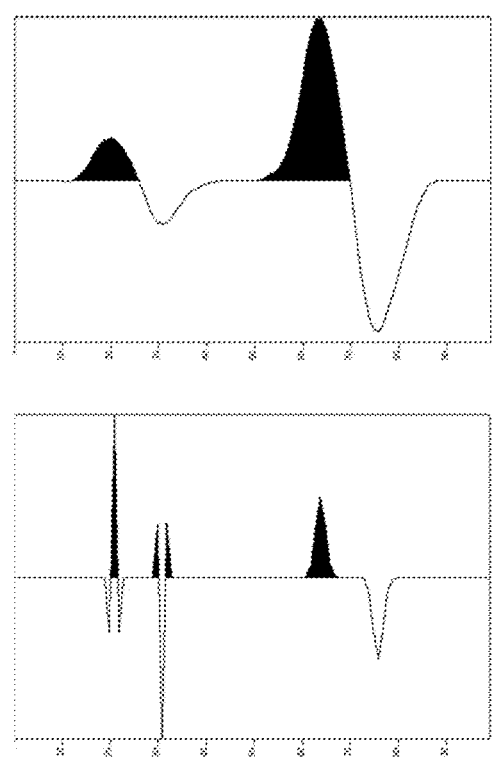
FIG. 1 illustrates an aspect of b-spline projection, in accordance with some embodiments.

Although these norms are the proper mathematical vehicles to construct the objective functions that are free of local minima, the algorithms for computing these norms are themselves subject to local minima. Alternatively, Xue et al. (2016) demonstrated that with a simple smoothing kernel in data residual, much of the local minima are removed. We propose a basis spline (b-spline) projection method in data domain to merge cycle skips between the synthetic and the observed events. The b-splines, unlike the Fourier basis, are locally supported basis functions. They respond to locally separated events in a local fashion. The objective function is constructed in L2 sense following the b-spline projection to the point-wise data residual. The right panel of FIG. 1 and FIG. 2 illustrate the b-spline project and compare it to OT. We explain a scale matching procedure for FWI that converges reasonably fast to the optimum solution.

The full waveform inversion (FWI) pioneered by Lailly (1983) and Tarantola (1984) has now become the main wave-equation method for inverting the seismic velocity field. The robustness of FWI largely rely on the mathematical construction of the objective functions. From a physics point of view, these objective functions measure the travel-time misfit between the synthetic and the observed events. For data with sufficient low temporal frequencies, the data residual, obtained as the point-wise difference between synthetic and observed data, becomes proportional in amplitude to the travel-time misfit. Injecting these data residuals in the gradient integral produces desired cancellations among the overlaid diving wave-paths, so that the net outcome survived from the cancellation is smooth in the spatial directions supported by the data. In the current stage, it is this smooth update made conventional FWI successful for the shallow velocity update. The issue of the low frequency is conventionally linked to the diving waves. There are efforts trying to extend the computation of the travel-time misfit from diving waves to reflections (Clement et al., 2001; Xu et al., 2012; Jiao et al., 2015). To address the concerns of the low frequency content that are often missing in field data, Fei et al. (2012) proposed a sparse deconvolution method to recover them. Recently, algorithms for computing the Kantorovich-Rubinstein norm or the Wasserstein norm arising from the optimum transport problem have been introduced into the seismic processing community (Engquist and Frese, 2014; Metivier et al., 2016). However, optimum transport can produce a coarse output signal with a large amount of noise and unwanted spectrum boastings.

We describe a b-spline projection method in data domain. The same operation applied in model space has been explained in Shen et al. (2003) and Shen and Symes (2008). The details of b-spline implementation are known. We shall briefly recast some of the key concepts. Let $N_i^p(t)$, i=0, 1, . . . , m+p−1, be a set of 1-dimensional b-spline basis functions with the degree of smoothness p (meaning p−1 times differentiable), which are defined over m+p non-decreasing node points evenly spaced with exceptions for the first p and the last p points whose locations repeat p times. The repeated nodes allow the projected function transits smoothly to the boundary. Due to this node setting, we have m−p+1 equal intervals on the real line. The 1-D forward b-spline projection, denoted by $B_m^q$, applied to a set of b-spline coefficient $b_i$, i=0, 1, . . . , m+p−1, is given as $$B_m^q(b) = \sum_{i=0}^{m+p-1} b_i N_i^p(t)$$

The multi-dimensional forward b-spline projection is treated as the Cartesian product. We denote the k-dimensional b-spline forward projection as $B_{m_1, m_2, \ldots, m_k}^{p_1, p_2, \ldots, p_k}$, where $p_1, p_2, \ldots, p_k$ are the degrees of the smoothness in each dimension and $m_1, m_2, \ldots, m_k$ are number of points less the multiplicity in each dimension, ordered from the fastest dimension to the slowest dimension.

The b-spline projected objective function, proposed in an embodiment, is:

$$J(V) = 1/2 \|B_d B^*_d (d^s(V) - d^0)\|^2 \quad (1)$$

where $\|\cdot\|$ is the L2 norm; the synthetic data $d^s$ is viewed as a function of velocity V; $d^0$ denotes the observed data; $B_{m_1,m_2,m_3}^{p_1,p_2,p_3}$ where is the data domain forward b-spline projection with $m_1$, $m_2$ and $m_3$ associated to time, in-line and cross-line dimensions, respectively; the degree of smoothness $p_1 = p_2 = p_3 \geq 3$; $B^*_d$ is the adjoint of $B_d$. By adjusting the integer dimensional parameters in $m_1$, $m_2$ and $m_3$, especially $m_1$, certain cycle skips between $d^s$ and $d^0$, if they exist, are smeared out. The corresponding objective function, shown in equation (1), is much less likely to be trapped by local minima. The gradient of this objective function with respect to velocity follows a standard formulation:

$$\nabla_V J = \left(\frac{\partial d^s(V)}{\partial V}\right)^* (B_d B^*_d B_d B^*_d (d^s - d^0)) \quad (2)$$

In computing the gradient we use the source wavelet that has the same power spectrum as that of $d^0$. This choice has the operational simplicity and makes the function-gradient pair exact. Equations (1) and (2) suggest the difference from the standard high frequency FWI compared to this work is that we have replaced the conventional data residual $d^s - d^0$ by $(B_d B^*_d B_d B^*_d (d^s - d^0))$.

The application of the b-spline projection for high frequency FWI can be described in three steps:

a) Compute the objective function, J(V), according to equation (1);

b) Compute the gradient with respect to velocity, $\nabla_V J$, according to equation (2);

c) Produce a quasi-Newton's update to V, and then repeat the steps a, b and c.

The simple procedure outlined above can already generate quite satisfactory results for the Marmousi example described below.

Figure 3:
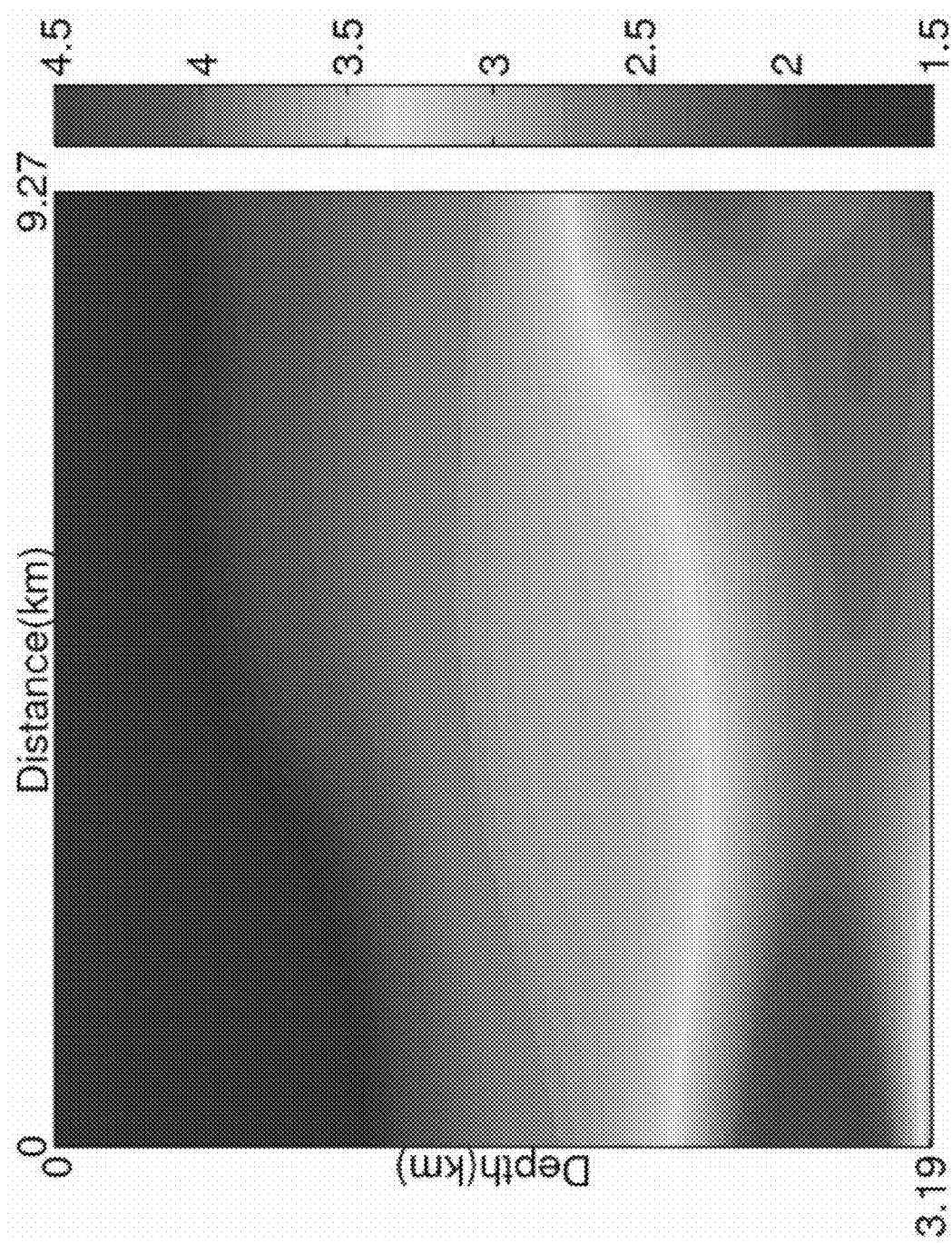
FIG. 3 is an initial P-wave velocity ($V_p$) model for the Marmousi model.
Figure 4B:
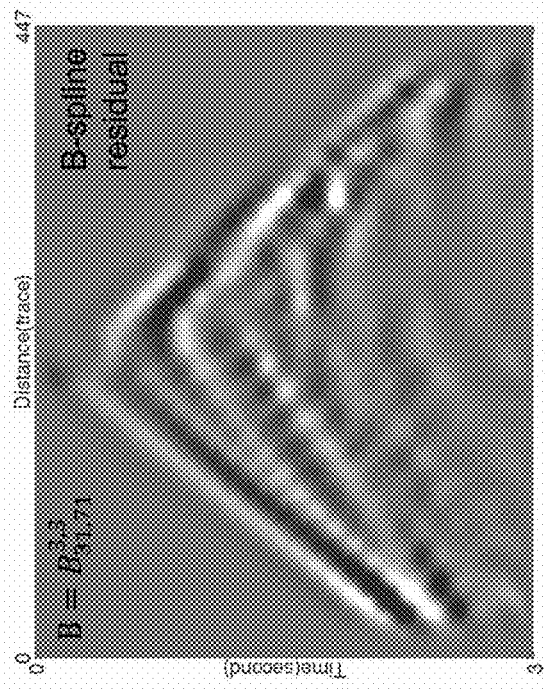
FIGS. 4A-4D illustrate aspects of the Marmousi model as handled by some embodiments.
Figure 4D:
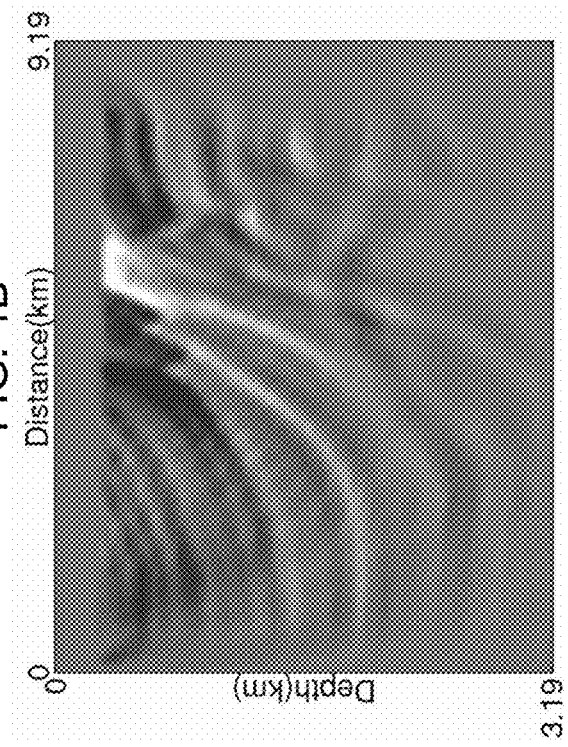
Figure 4A:
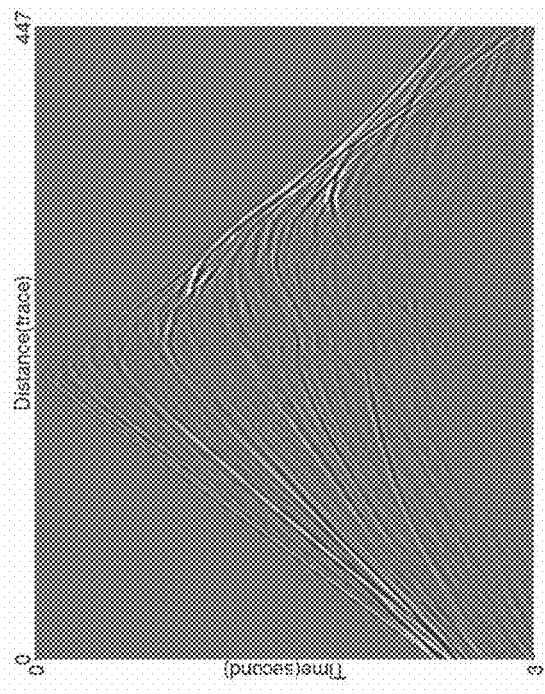
Figure 4C:
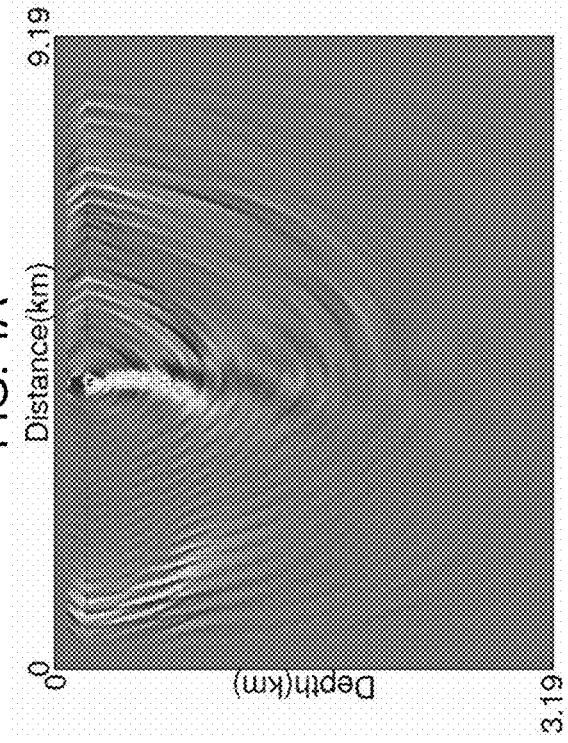
Figures 5A, 5B:
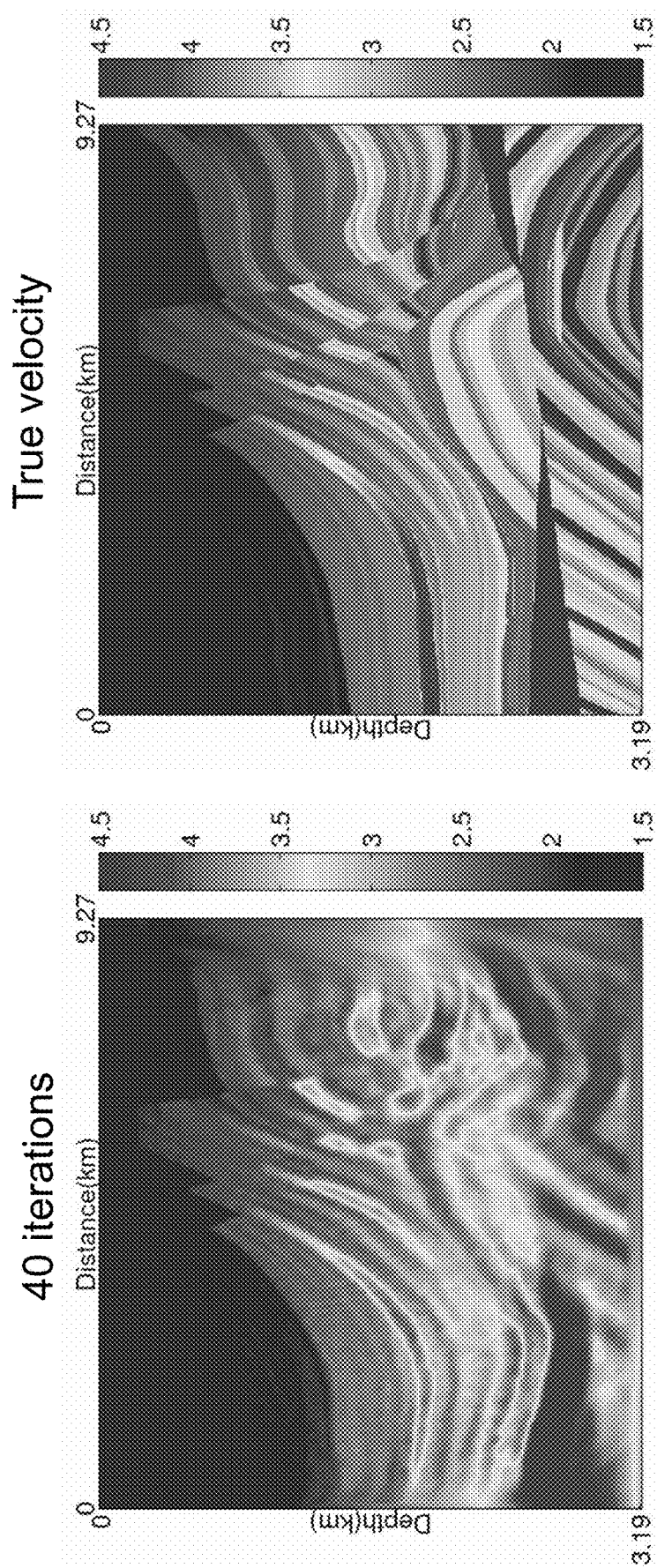
FIGS. 5A-5B compare a result of an embodiment of the present invention with the true answer.

The true Marmousi velocity model is shown in FIG. 5B. We use a Ricker wavelet of peak frequency 15 Hz to simulate the "observed" data. The simulator is an elastic code but running at constant density and zero shear velocity. All reflections are generated from the pressure velocity perturbations. The maximum recording time is 3 seconds and the sampling interval in time is 6 ms. The averaged power spectrum normalized by the maximum value from a shot gather at the center of the model shows the frequency content is up to 47 Hz. We generate an initial velocity model (FIG. 3) by significantly smoothing the true Marmousi model. At the first iteration, the data residual obtained as a direct point-wise difference between the synthetic and the observed data, $d^s - d^0$, looks just like the high frequency data itself (FIG. 4A). In this particular gather, there are 448 traces span a distance of 9 km. It has been widely documented that the gradient computation using these types of data residual fails to produce good velocity updates. The 2-D shot gather as shown by FIG. 4A has a dimension of $N_t \times N_r = 501 \times 448$, where $N_t$ is the number of samples in time and $N_r$ is the number of receiver traces. FIG. 4B shows the residual after the b-spline projection by $(B_d B^*_d B_d B^*_d (ds^s - d^0))$, in which $B_d = B_{31,71}^{3,3}$. Here the sub-scripts 31 and 71 refer to the dimension parameters in time and receiver, respectively. Clearly, isolated events in FIG. 4A are merged into much fewer events each of which is of much larger scale in time. Unlike the Fourier low-pass filtering, these events are still local. The single shot gradient (FIG. 4C) does not resemble the structure of the true model. Instead, it produces many concentric circles around the source point. It is the stacking of many single shot gradients that reveals the structure of the true model (FIG. 4D). With 40 Linearized Broyden-Fletcher-Goldfarb-Shanno (L-BFGS) iterations, at a rate of 1-update/iteration, the resulting velocity is already interpretable.

In the next example, we use Marmousi data again but start the inversion with a vertical gradient initial velocity. We describe a scale-matching scheme that constrain the scales in data and model by the b-spline projection as follows.

1) Pick a set of b-spline dimension parameters $M_t$, $M_r$ so that $B_{M_t,M_r}^{3,3}(d^s)$ is expected to match $B_{M_t,M_r}^{3,3}(d^s)(d^0)$ within a quarter scale-length given the current velocity model.

2) Pick a set of b-spline dimension parameters $M_z, M_x$ in vertical and horizontal directions, respectively, so that the length-scales, $L_z/(M_x - 3 + 1), L_x/(M_z - 3 + 1)$, are approximately the length-scales of the velocity variations that one can expect to match the length-scales of $B_{M_t,M_r}^{3,3}(d^s)(d^s)$ from the forward simulation. Here $L_x$ and $L_z$ are, respectively, horizontal and vertical sizes of the model.

3) Solve $b^* = \arg\min_b \|B_d B^*_d B_d B^*_d (d^s(B_m b) - d^0)\|^2$ given the initial b-spline model parameters determined from solving $\arg\min_b \|B_m b - V_{init}\|^2$. Here $d^s$ is viewed as a function of a set of model space b-spline parameters b. The model space b-spline operator $B_m = B_{M_z,M_x}^{3,3}$ and the data domain b-spline operator $B_d = B_{M_z,M_x}^{3,3}$ work in separate domains simultaneously.

4) Repeat the steps 1-4 with properly increased $M_t$, $M_r$, $M_z$, and $M_x$ so that the matching between length-scales of the b-spline projected data and the model is maintained.

In computing the step 3 of the above scheme, one would need to execute steps a-c outlined in example 1 in b, the model space b-spline parameters.

Starting from a vertical gradient initial velocity model (FIG. 6A), we conduct the inversion in three scales consecutively each of which takes 10 iterations. We record the b-spline projections within each scale as follows.

A) The first 10 iterations: $B_d = B_{15,71}^{3,3}$, $B_m = B_{30,50}^{3,3}$,

B) The second 10 iterations: $B_d = B_{30,71}^{3,3}$, $B_m = B_{60,100}^{3,3}$,

C) The third 10 iterations: $B_d = B_{50,100}^{3,3}$, $B_m = B_{120,200}^{3,3}$.

In the first 10 iterations, the operator $B_d = B15,71^{3,3}$ produces a length-scale in data at about 0.3 sec×65 m and the length-scale in model is about 130 m×210 m. We see in FIG. 6B that the bulk of the Marmousi model is already well emerging due the inversion at this scale level. We take the ending velocity from the first 10 iteration and feed it in as the initial velocity for the next 10 iterations of inversion at the second scale. We see at the end of the second 10 iterations the inverted velocity is able to respond to the data with a lot more details (FIG. 6C). We continue this procedure to the next refined scale level. FIG. 6D shows the velocity reveals even more details at the end of the third 10 iterations. Altogether, we had run 30 L-BFGS iterations at a rate of 1-update/iteration in three consecutively increasing scales to reach to a velocity that is well interpretable.

Figure 7A:
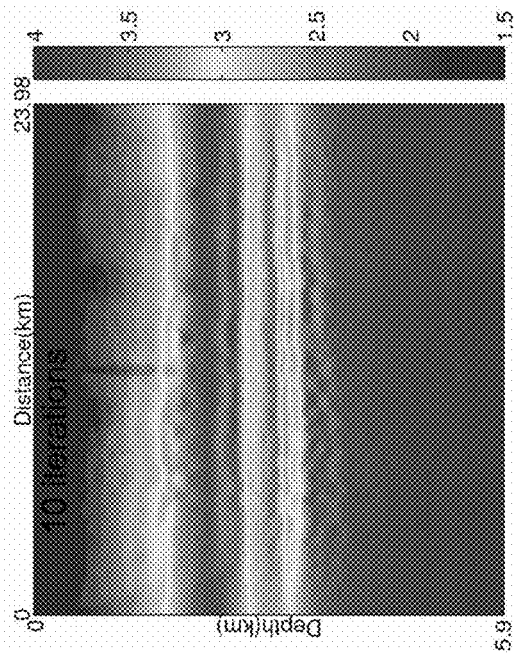
FIGS. 7A-7E illustrate intermediate and final results of some embodiments for a different model.

In the third example, we apply our algorithm to a realistic 2d data set. Shown in FIG. 7A is the 1-D initial velocity obtained by stacking the true velocity horizontally followed by a b-spline fit with 15 parameters. In other words, this model has 15 degrees of freedom. We comment that in real data situations, solving the velocity model up to 15 unknowns from ray tomography or stochastic inversion is oftentimes achievable but with difficulties that vary with conditions. The data is peaked at 15 hz and consists of 236 shot gathers evenly distributed over a horizontal distance of about 24 km. The maximum offset is 6 km. Each recorded trace has 801 samples at a sampling interval of 6 ms. We conduct the inversion sequentially in three scales as follows:

$$B_d = B_{71,71}^{3,3}, B_m = B_{150,150}^{3,3}$$

$$B_d = B_{0.81 \times N_t, 0.81 \times N_r}^{3,3}, B_m = B_{N_z, N_x}^{3,3}$$

$$B_d = B_{0.99 \times N_t}^{3,3}, B_{N_z, N_z}^{3,3}$$

Figure 7B:
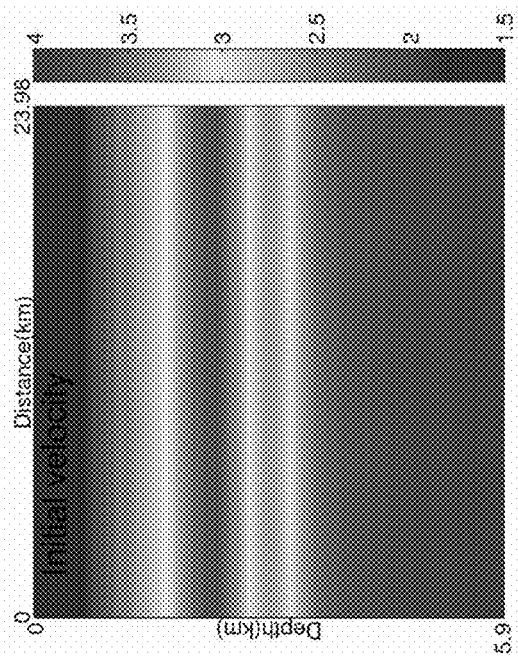
Figure 7C:
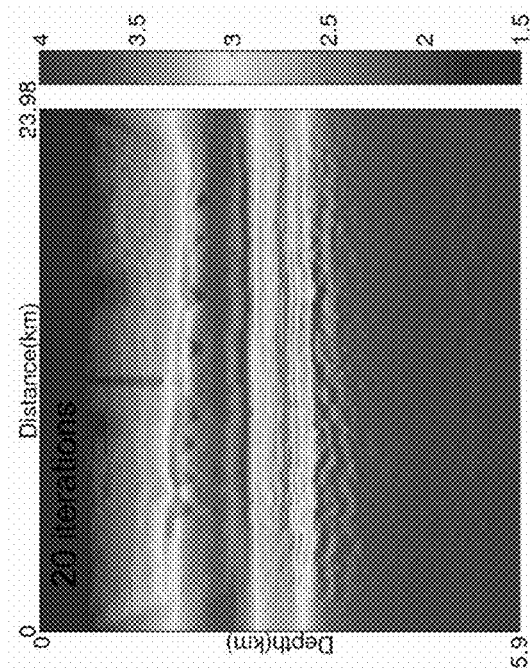
Figure 7E:
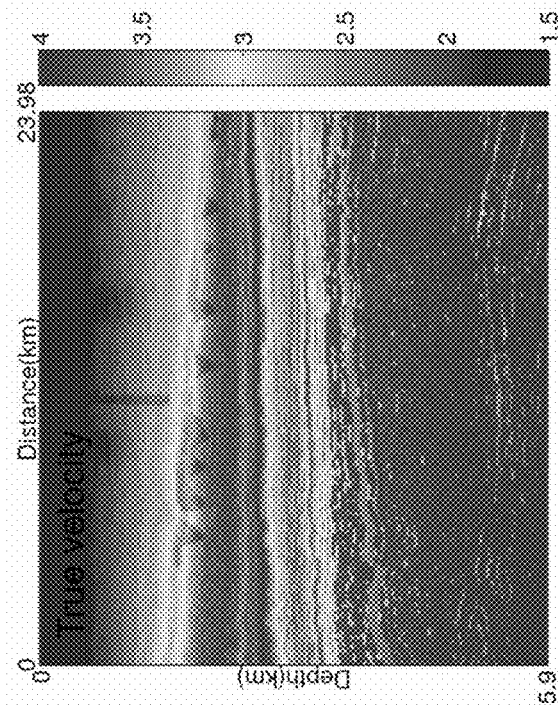
Figure 7D:
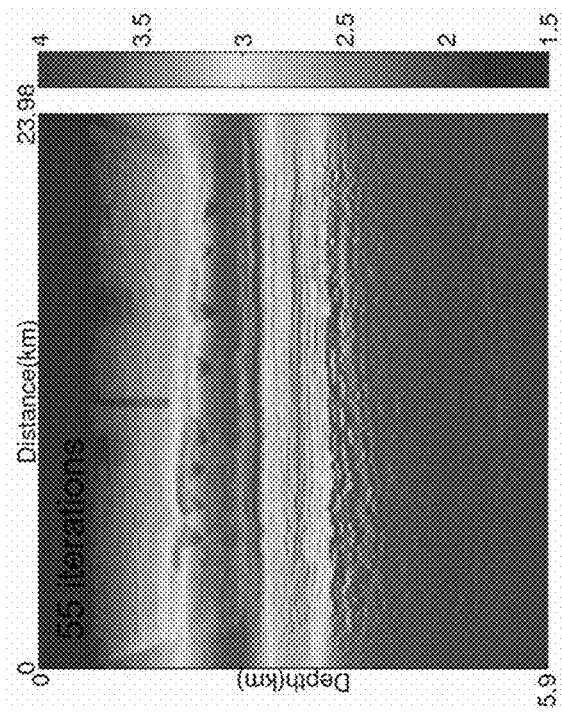

Here $N_t$, $N_r$, $N_z$, and $N_x$ are the number of samples in time of data domain, receiver of data domain, model space depth and model space horizontal distance, respectively. It takes 10 iterations at the first scale to arrive at a velocity that is full of detailed features at the correct position across the depths (FIG. 7B). The dipping structure in the shallow that is missing from the initial model has also been introduced due to the inversion. We transit to the next scale for another 10 iterations. We then take the ending result of the second 10 iteration (FIG. 7C) to start the inversion at the third scale. FIG. 7D shows the result of the 35th iteration for scale 3. Altogether, we mark this result as iteration 55 since 10 iterations each have been conducted at scale 1 and 2 before this run. Except for regions close to the horizontal boundaries, the dipping structure is reconfirmed and strengthened by the inversion. The kinematics and the amplitude of the structure agree fairly close to the true structure shown in FIG. 7E.

The b-spline projections combine and transform a bundle of local events in amplitude and phase into a new event that is smooth, local and lower in frequency. This transformation certainly helps the objective function, in L2 sense, avoid much of the local minima. More importantly it helps the gradient to respond properly to the diving waves and the reflections. For the diving waves, the b-spline projection produces the desired phase rotation between the synthetic and the observed events even they are cycle skipped. This mechanism of producing the phase rotation for the diving waves is very similar to what the Kantorovich-Rubinstein norm of the optimum transport would produce to data residual (Mtivier et al. (2016)). For reflections, the merged events by the b-spline projection are migrated through the gradient computation to the correct position in model. This requires the background velocity to be roughly "correct" to the scale for which this event is formed. The challenge remains for how to obtain a background velocity that is correct with respect to the maximum scale that the data can support.

We have shown a method of full waveform inversion by the b-spline projection in data domain. The objective function constructed via the b-spline construction has much fewer local minima compared to the conventional FWI objective functions. The fast convergence is achieved if the background velocity is correct with respect to the scale to which the b-spline projection corresponds. We show also that in both domains of the velocity inversion, model and data, the b-spline projection is a good choice to improve the convergence of the classical FWI method. The velocity model generated by this method can be used for seismic imaging. Seismic imaging may impact hydrocarbon reservoir delineation and well planning.

We have shown a method of full waveform inversion by the b-spline projection in data domain. The objective function constructed via the b-spline construction has much fewer local minima compared to the conventional FWI objective functions. The fast convergence is achieved if the background velocity is correct with respect to the scale to which the b-spline projection corresponds. We show also that on both end of the velocity inversion, model and data, the b-spline projection is a good choice to improve the convergence of the classical FWI method.

Figure 8B:
FIGS. 8A-8C illustrate results of some embodiments for a different model.
Figure 8A:
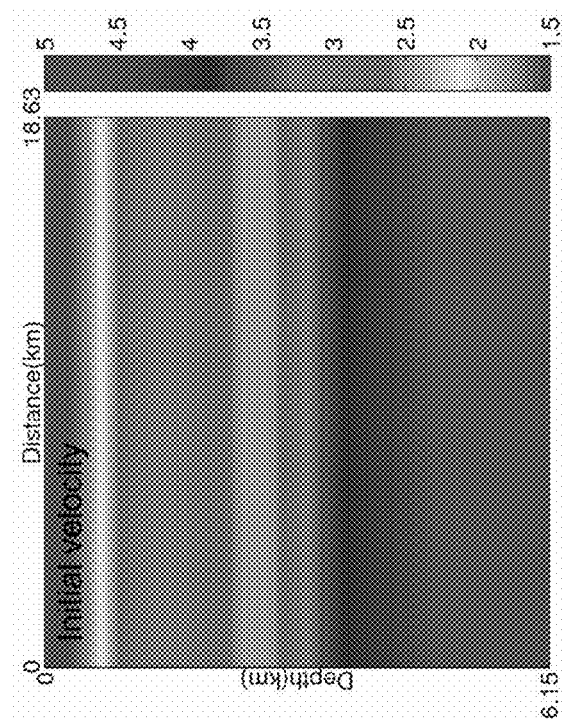
Figure 8C:
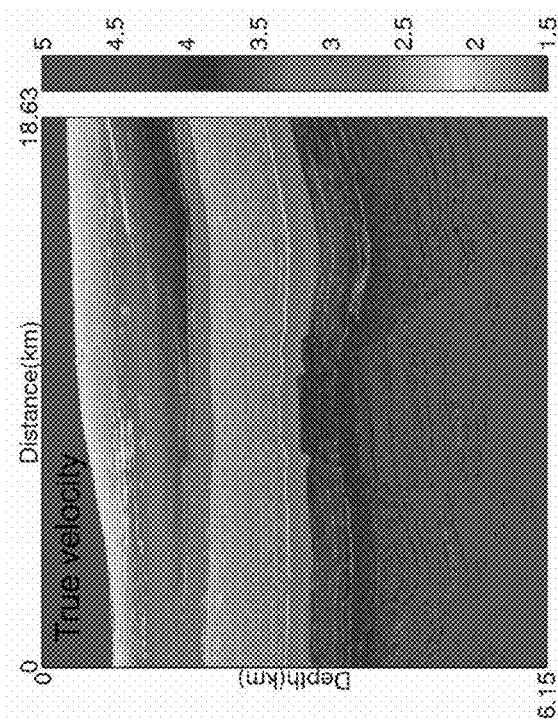
Figure 9A:
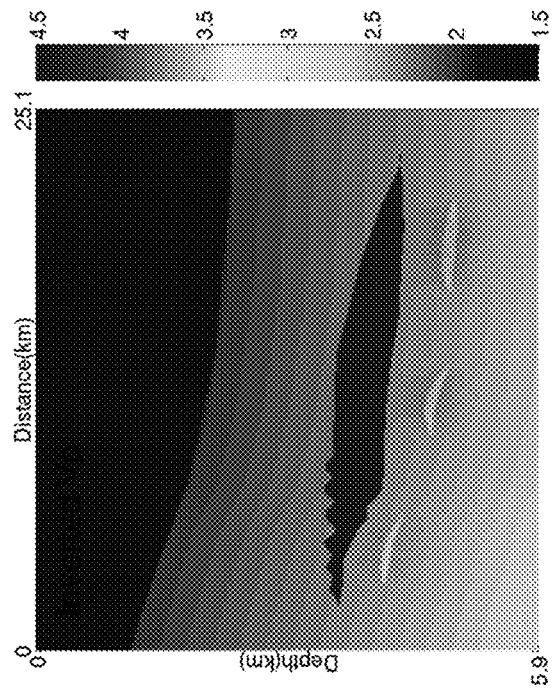
FIGS. 9A-9C illustrate $V_p$ results of some embodiments for a different model.
Figure 9B:
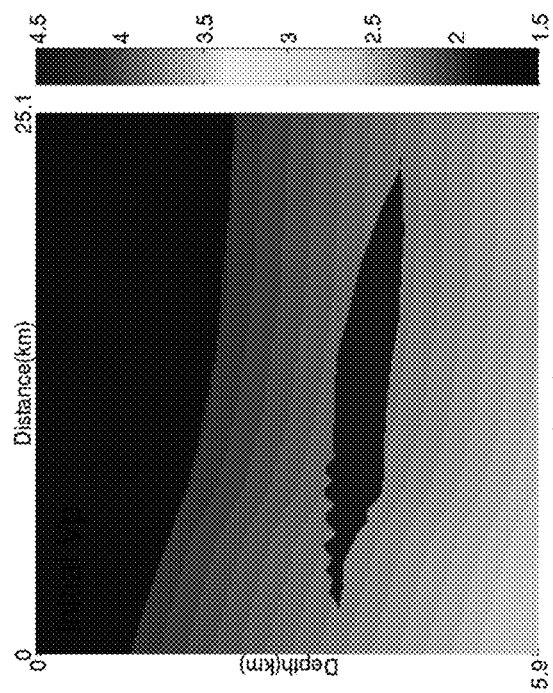
Figure 9C:
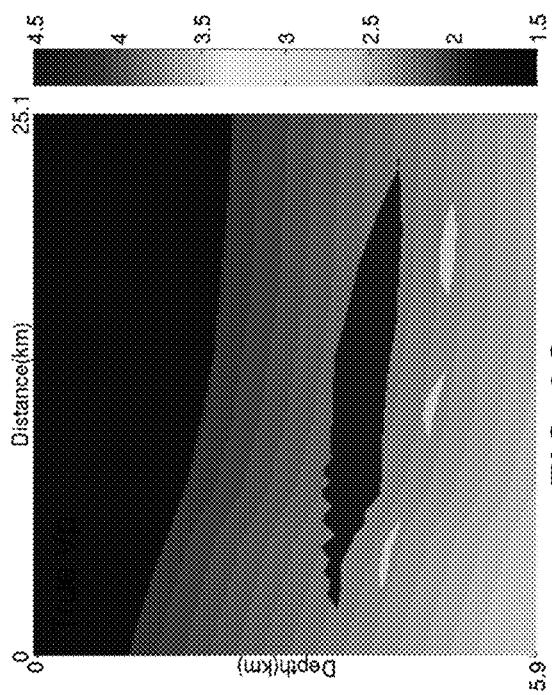
Figure 10A:
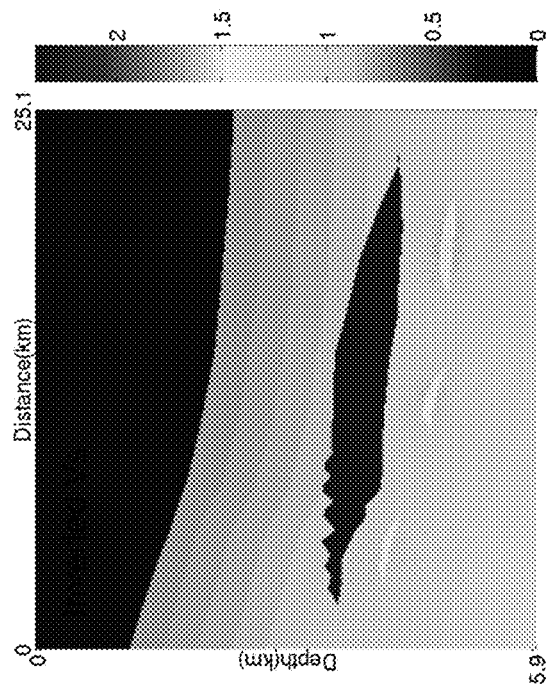
FIGS. 10A-10C illustrate $V_s$ results of some embodiments for a different model.
Figure 10B:
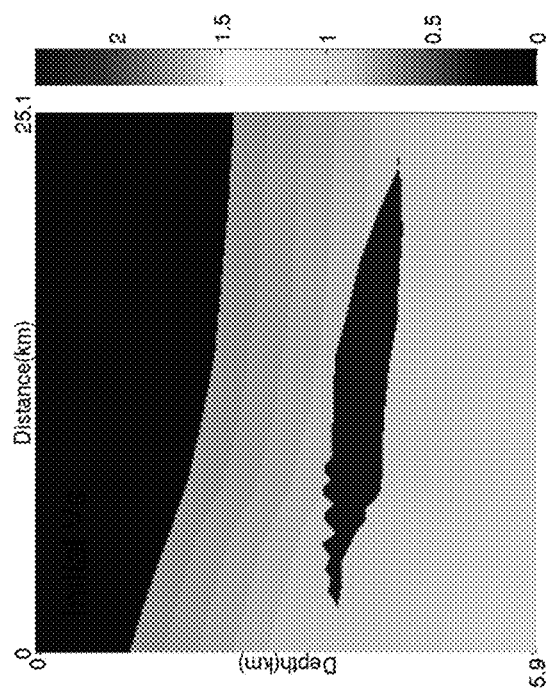
Figure 10C:
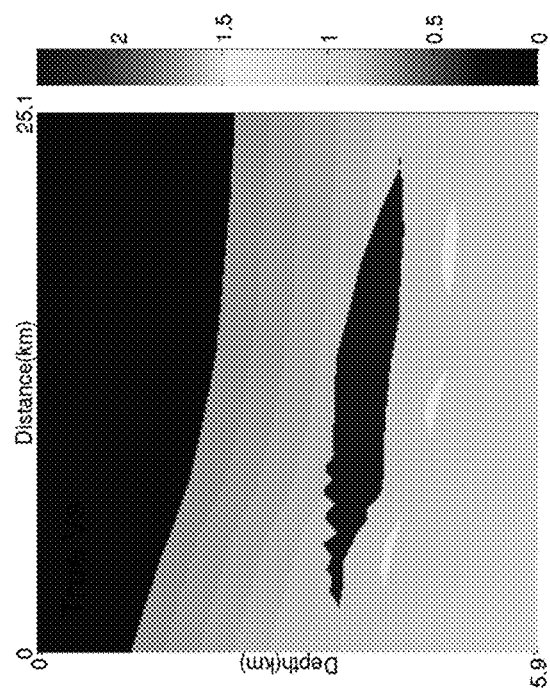

FIGS. 8A-8C, 9A 9C, and 10A-10C show other examples with the initial velocity models as FIGS. 8A, 9A, and 10A, the true velocities as FIGS. 8C, 9C, and 10C, and the inversion results as FIGS. 8B, 9B, and 10B. Note that FIGS. 9A-9C are the $V_p$ model and FIGS. 10A-10C are the $V_s$ model for the same subsurface region.

Figure 11:
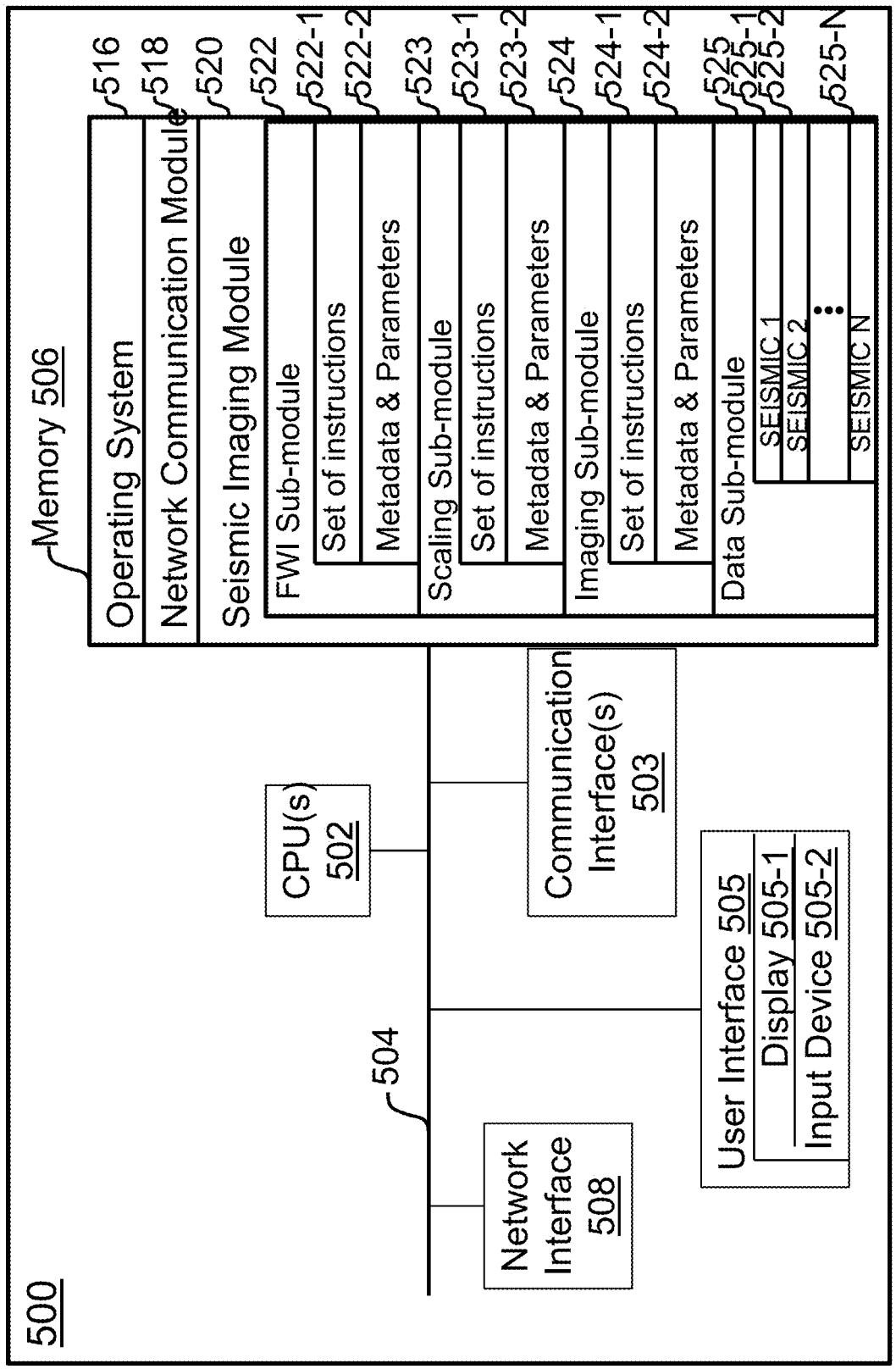
FIG. 11 is a block diagram illustrating a seismic imaging system, in accordance with some embodiments.

FIG. 11 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of the method described above. Seismic imaging module 520 may include data sub-module 525, which handles the seismic dataset including seismic gathers 525-1 through 525-N. This seismic data is supplied by data sub-module 525 to other sub-modules.

FWI sub-module 522 contains a set of instructions 522-1 and accepts metadata and parameters 522-2 that will enable it to execute operations of the method described above. The scaling sub-module 523 contains a set of instructions 523-1 and accepts metadata and parameters 523-2 that will enable it to contribute to the method. The imaging sub-module 524 contains a set of instructions 524-1 and accepts metadata and parameters 524-2 that will enable it to use the velocity model generated by the FWI sub-module 522 and the scaling sub-module 523 to generate a seismic image. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method is, optionally, governed by instructions that are stored in computer memory or a non-transitory computer readable storage medium (e.g., memory 506 in FIG. 11) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the method is described as being performed by a computer system, although in some embodiments, various operations of the method are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

Clement, F., G. Chavent, and S. Gomez, 2001, Migration-based traveltime waveform inversion of 2d simple structures: A synthetic example: Geophysics, 66, 845-860.

Engquist, B., and B. Frese, 2014, Application of the wasserstein metric to seismic signals: Communications in Mathematical Sciences, 12, 979-988.

Fei, T. W., Y. Luo, F. Qin, and P. G. Kelamis, 2012, Full waveform inversion without low frequencies: A synthetic study: Presented at the 74th Annual International Meeting, Expanded Abstracts, Society of Exploration Geophysicists.

Jiao, K., S. Sun, X. Cheng, and D. Vigh, 2015, Matching pursuit full waveform inversion: Presented at the 77th Conference & Exhibition, Extended Abstracts, EAGE.

Lailly, P., 1983, The seismic inverse problem as a sequence of before-stack migrations, in Conference on Inverse Scattering: Theory and Applications: Society for Industrial and Applied Mathematics, 206-220.

Metivier, L., R. Brossier, Q. Merigot, E. Oudet, and J. Vireux, An Optimal Transport Distance for Full Waveform Inversion: Application to the 2014 Chevron Benchmark Data-Set, SEG International Exposition and 86th Annual Meeting, 2016,1278-1283.

Shen, P., C. Stolk, and W. Symes, 2003, Differential semblance velocity analysis by wave-equation migration: Expanded Abstracts, Society of Exploration Geophysicists, 73rd Annual International Meeting, 2132-2135.

Shen, P., and W. W. Symes, 2008, Automatic velocity analysis via shot profile migration: Geophysics, 73, VE49VE59.

Tarantola, A., 1984, Inversion of seismic reflection data in the acoustic approximation: Geophysics, 49,1259-1266.

Xu, S., D. Wang, F. Chen, Y. Zhang, and G. Lambare, 2012, Inversion on Reflected Seismic Wave: 74th Annual International Meeting, Expanded Abstracts, Society of Exploration Geophysicists, W024.

Xue, Z., N. Alger, and S. Fomel, 2016, Full waveform inversion using smoothing kernels: 86rd Annual International Meeting, Expanded Abstracts, Society of Exploration Geo-physicists, 1358-1363.

What is claimed is:

1. A computer-implemented method, comprising:
   a. receiving, at one or more computer processors, a seismic dataset representative of a subsurface volume of interest and an initial earth model;
   b. performing, via the one or more processors, full waveform inversion using b-splines to generate an updated earth model, wherein the performing the full waveform inversion using b-splines comprises:
      i. computing an objective function, J(V), according to
      $$J(V) = \frac{1}{2}\|B_d B_d^* (d^s(V) - d^0)\|^2;$$
      ii. picking a set of b-spline dimension parameters $M_t$, $M_r$ so that $B_{M_t,M_r}^{c1,c2}(d^s)$ is expected to match $B_{M_t,M_r}^{c1,c2}(d^0)$ within a quarter scale-length given the initial earth model wherein c1 and c2 are degrees of smoothness associated to each b-spline dimension;
      iii. picking a set of b-spline dimension parameters $M_z$, $M_x$ in vertical and horizontal directions, respectively, so that length-scales, $L_z/(M_x-c1+1), L_x/(M_z-c2+1)$, are approximately length-scales of velocity variations that match length-scales of $B_{M_t,M_r}^{c1,c2}(d^s)$ from a forward simulation, where $L_x$ and $L_z$ are horizontal and vertical sizes of the model;
      iv. solving $b^* = \arg\min_b \|B_d B_d B_d B_d^*(d^s(B_m b) - d^0)\|^2$ given initial b-spline model parameters determined from solving $\arg\min_b \|B_m b - V_{init}\|^2$, where $d^s$ is a function of a set of model space b-spline parameters b, wherein model space b-spline operator $B_m = B_{M_z,M_x}^{c1,c2}$ and data domain b-spline operator $B_d = B_{M_t,M_r}^{c1,c2}$ work in separate domains simultaneously;
      v. repeating the steps of computing the objective function, picking the set of b-spline dimension parameters $M_t$, $M_r$, picking the set of b-spline dimension parameters $M_z$, $M_x$ and solving $b^*$ with increased $M_t$, $M_r$, $M_z$, and $M_x$ so that matching between length-scales of b-spline projected data and the model is maintained;
      vi. computing a gradient with respect to velocity, $\nabla_V J$, according
      $$\nabla_V J = \left(\frac{\partial d^s(V)}{\partial V}\right)^* (B_d B_d^* B_d B_d^*(d^s - d^0));$$
   c. producing a quasi-Newton's update to generate the updated earth model;
   d. performing, via the one or more processors, seismic imaging using the updated earth model to generate a seismic image; and
   e. displaying, via a user interface, the seismic image.

2. The method of claim 1 further comprising using the seismic image to select locations to drill at least one well in order to extract hydrocarbons.

3. A computer system, comprising:
   one or more processors;
   memory; and one or more programs, wherein the one or more programs are stored in the memory and configured to be executed by the one or more processors, the one or more programs including instructions that when executed by the one or more processors cause the computer system to:
   a. receive, at one or more processors, a seismic dataset representative of a subsurface volume of interest and an initial earth model;
   b. perform, via the one or more processors, full waveform inversion using b-splines to generate an updated earth model, wherein the full waveform inversion using b-splines comprises:
      i. computing an objective function, J(V), according to
      $$J(V) = \frac{1}{2}\|B_d B_d^* (d^s(V) - d^0)\|^2;$$
      ii. picking a set of b-spline dimension parameters $M_t$, $M_r$ so that $B_{M_t,M_r}^{c1,c2}(d^s)$ is expected to match $B_{M_t,M_r}^{c1,c2}(d^0)$ within a quarter scale-length given the initial earth model wherein c1 and c2 are degrees of smoothness associated to each b-spline dimension;
      iii. picking a set of b-spline dimension parameters $M_z$, $M_x$ in vertical and horizontal directions, respectively, so that length-scales, $L_z/(M_x-c1+1)$, $L_x/(M_z-c2+1)$, are approximately length-scales of velocity variations that match length-scales of $B_{M_t,M_r}^{c1,c2}(d^s)$ from a forward simulation, where $L_x$ and $L_z$ are horizontal and vertical sizes of the model;
      iv. solving $b^* = \arg\min_b \|B_d B_d B_d B_d^*(d^s(B_m b) - d^0)\|^2$ given initial b-spline model parameters determined from solving $\arg\min_b \|B_m b - V_{init}\|^2$, where $d^s$ is a function of a set of model space b-spline parameters b, wherein model space b-spline operator $B_m = B_{M_z,M_x}^{c1,c2}$ and data domain b-spline operator $B_d = B_{M_t,M_r}^{c1,c2}$ work in separate domains simultaneously;
      v. repeating the steps of computing the objective function, picking the set of b-spline dimension parameters $M_t$, $M_r$, picking the set of b-spline dimension parameters $M_z$, $M_x$ and solving $b^*$ with increased $M_t$, $M_r$, $M_z$, and $M_x$ so that matching between length-scales of b-spline projected data and the model is maintained;
      vi. computing a gradient with respect to velocity, $\nabla_V J$, according
      $$\nabla_V J = \left(\frac{\partial d^s(V)}{\partial V}\right)^* (B_d B_d^* B_d B_d^*(d^s - d^0));$$
   c. perform, via the one or more processors, seismic imaging using the updated earth model to generate a seismic image; and
   d. display, via a user interface, the seismic image.

4. A non-transitory computer readable storage medium storing one or more programs, the one or more programs comprising instructions, which when executed by an electronic device with one or more processors and memory, cause the device to:
  a. receive, at one or more processors, a seismic dataset representative of a subsurface volume of interest and an initial earth model;
  b. perform, via the one or more processors, full waveform inversion using b-splines to generate an updated earth model, wherein the full waveform inversion using b-splines comprises:
    i. computing an objective function, $J(V)$, according to $$J(V) = \frac{1}{2}\|B_d B_d^*(d^s(V) - d^0)\|^2;$$

ii. picking a set of b-spline dimension parameters $M_t$, $M_r$ so that $B_{M_t,M_r}^{c1,c2}(d^s)$ is expected to match $B_{M_t,M_r}^{c1,c2}(d^0)$ within a quarter scale-length given the initial earth model wherein c1 and c2 are degrees of smoothness associated to each b-spline dimension;
    iii. picking a set of b-spline dimension parameters $M_z$, $M_x$ in vertical and horizontal directions, respectively, so that length-scales, $L_z/(M_x-c1+1), L_x/(M_z-c2+1)$, are approximately length-scales of velocity variations that match length-scales of $B_{M_t,M_r}^{c1,c2}(d^s)$ from a forward simulation, where $L_x$ and $L_z$ are horizontal and vertical sizes of the model;
    iv. solving $b^* = \arg\min_b \|B_d B_d B_d B_d^*(d^s(B_m b) - d^0)\|^2$ given initial b-spline model parameters determined from solving $\arg\min_b \|B_m b - V_{init}\|^2$, where $d^s$ is a function of a set of model space b-spline parameters $b$, wherein model space b-spline operator $B_m = B_{M_z,M_x}^{c1,c2}$ and data domain b-spline operator $B_d = B_{M_t,M_r}^{c1,c2}$ work in separate domains simultaneously;
    v. repeating the steps of computing the objective function, picking the set of b-spline dimension parameters $M_t$, $M_r$, picking the set of b-spline dimension parameters $M_z$, $M_x$ and solving $b^*$ with increased $M_t$, $M_r$, $M_z$, and $M_x$ so that matching between length-scales of b-spline projected data and the model is maintained;
    vi. computing a gradient with respect to velocity, $\nabla_V J$, according $$\nabla_V J = \left(\frac{\partial d^s(V)}{\partial V}\right)^*(B_d B_d^* B_d B_d^*(d^s - d^0));$$

c. perform, via the one or more processors, seismic imaging using the updated earth model to generate a seismic image; and
  d. display, via a user interface, the seismic image.

* * * * *